March 8, 1932. G. DENT 1,848,326
VEHICLE HEADLIGHT
Filed Sept. 27, 1928 5 Sheets-Sheet 1
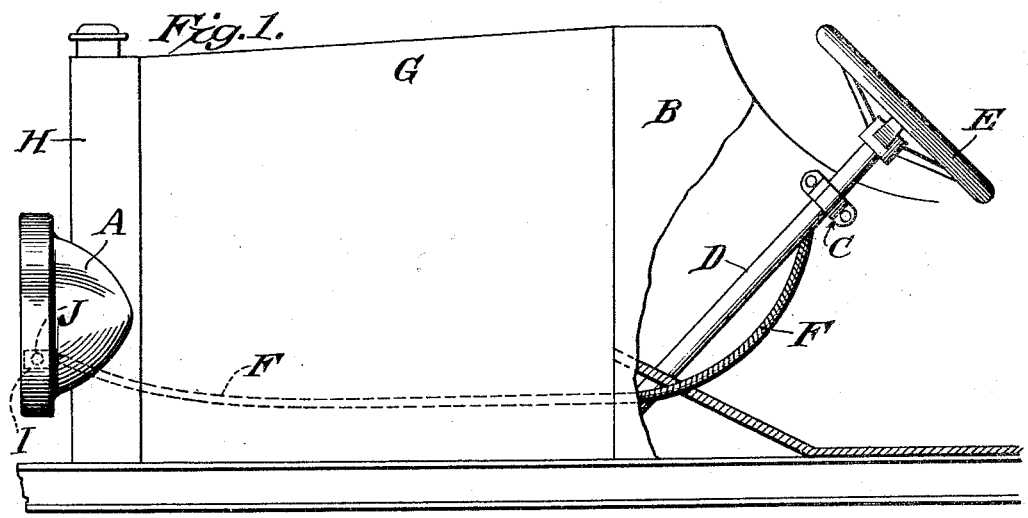
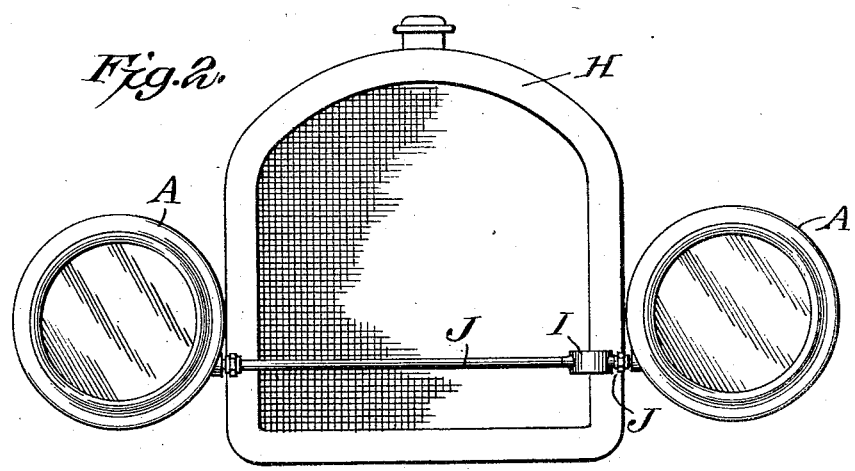
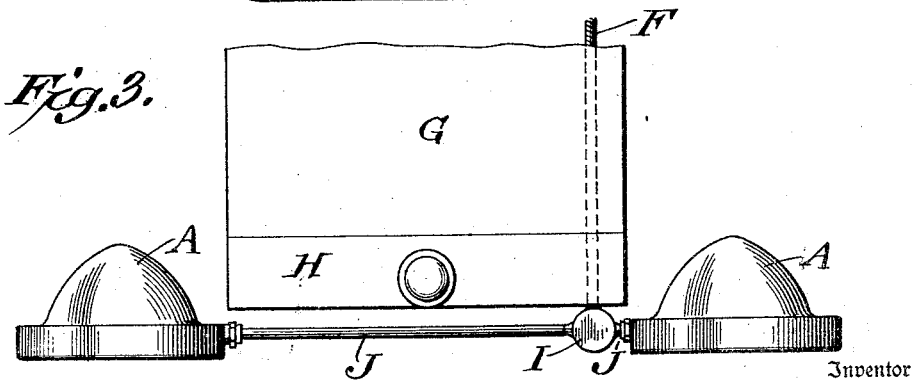
Inventor
GRATZ DENT
By _____, Attorney March 8, 1932.  G. DENT  1,848,326
VEHICLE HEADLIGHT
Filed Sept. 27, 1928   5 Sheets-Sheet 2
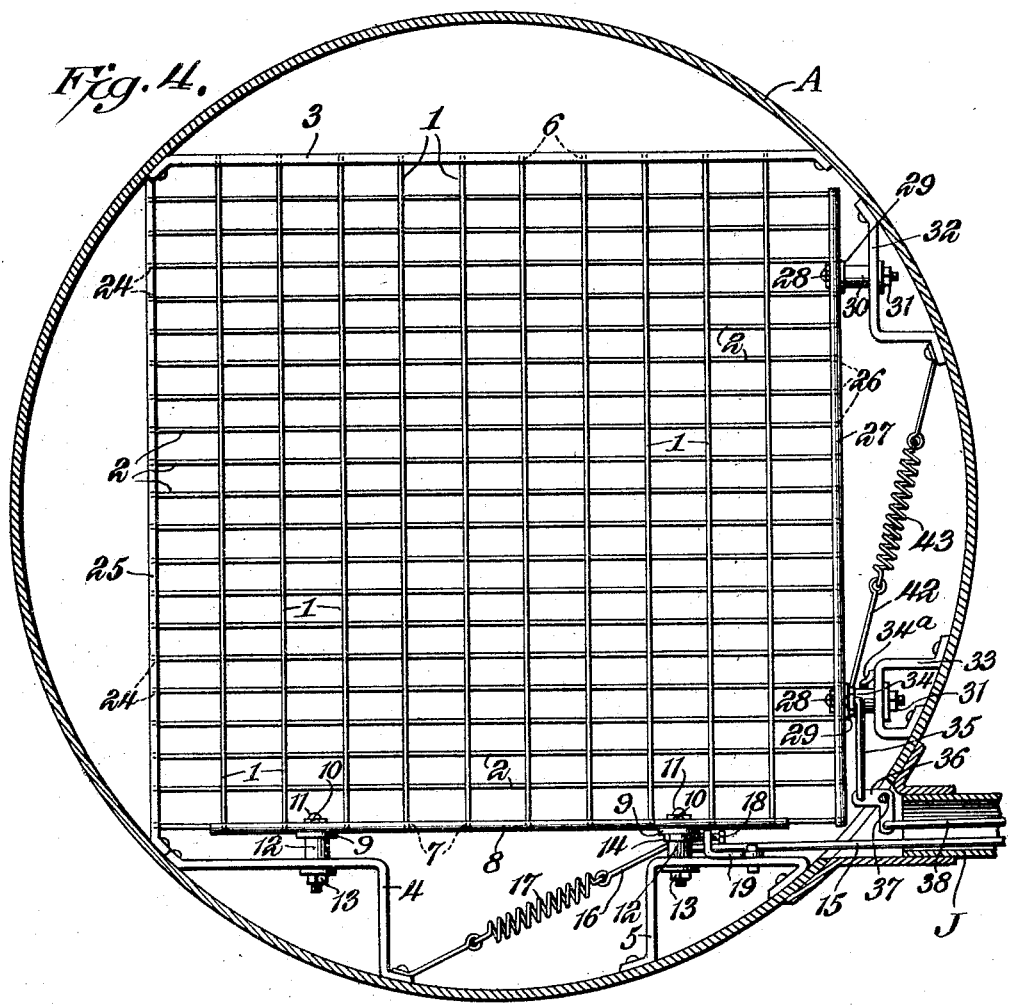
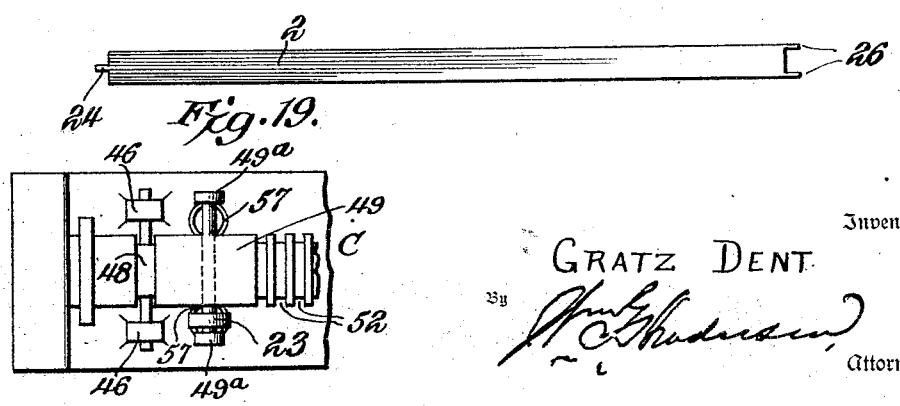
Inventor
GRATZ DENT
Attorney March 8, 1932.  G. DENT  1,848,326
VEHICLE HEADLIGHT
Filed Sept. 27, 1928   5 Sheets-Sheet 3
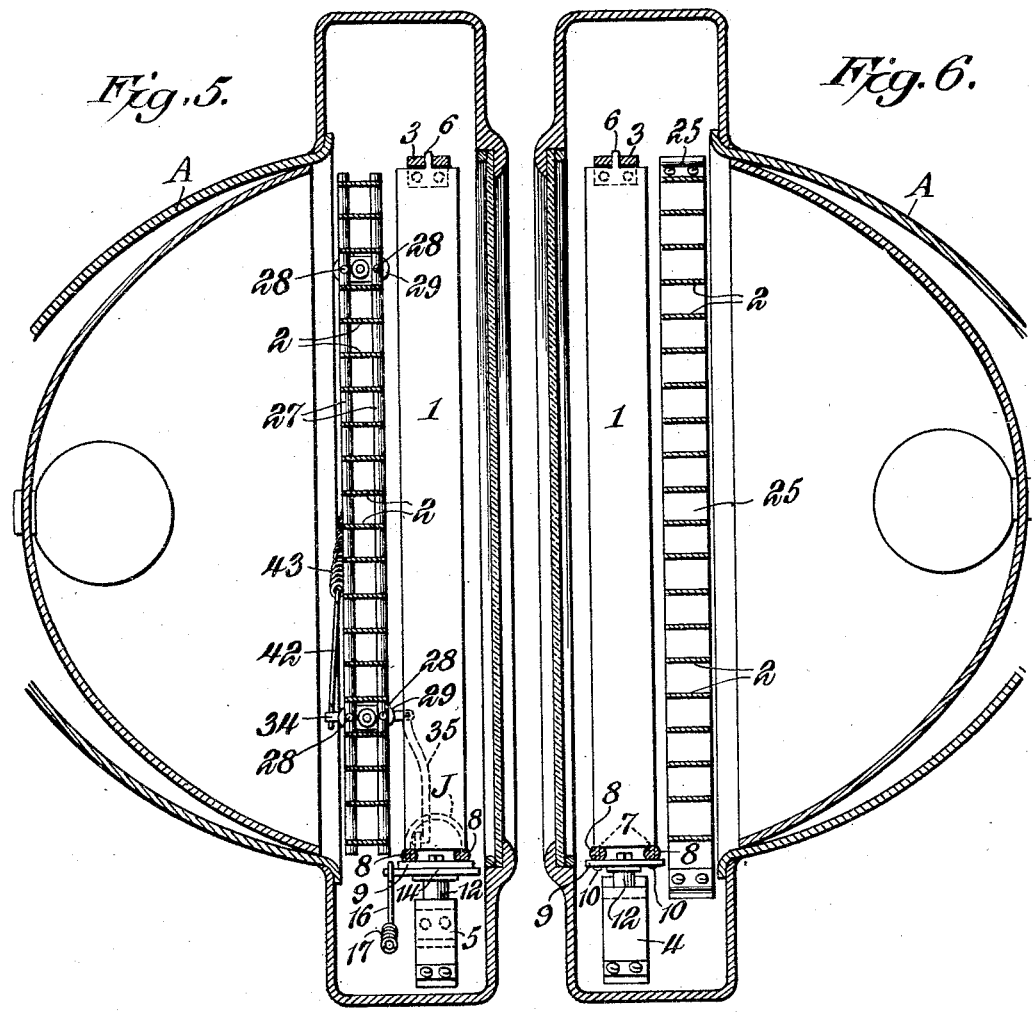
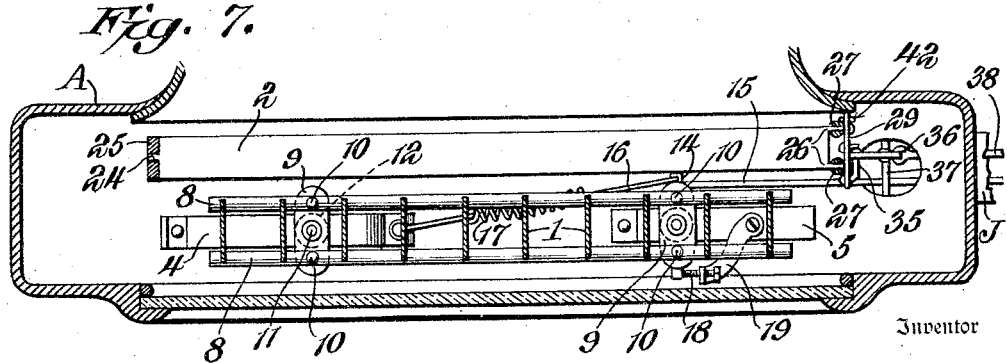
Inventor
GRATZ DENT
Attorney March 8, 1932.   G. DENT   1,848,326
VEHICLE HEADLIGHT
Filed Sept. 27. 1928    5 Sheets-Sheet 4
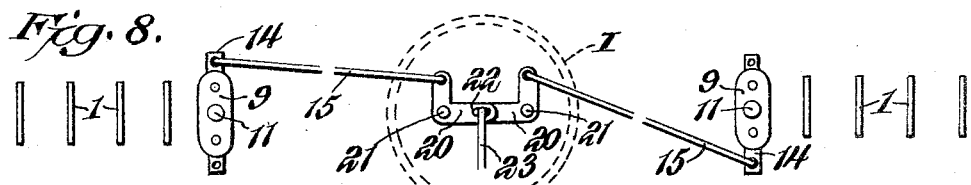
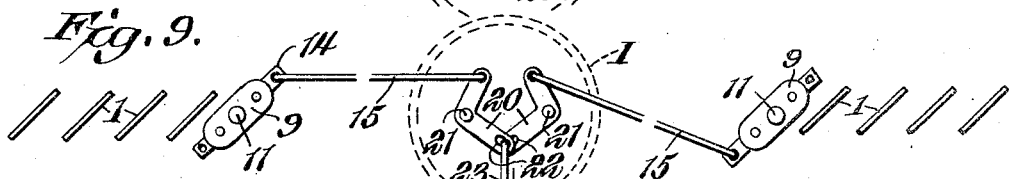
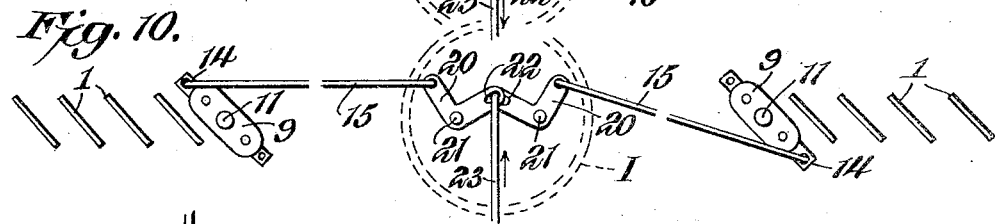
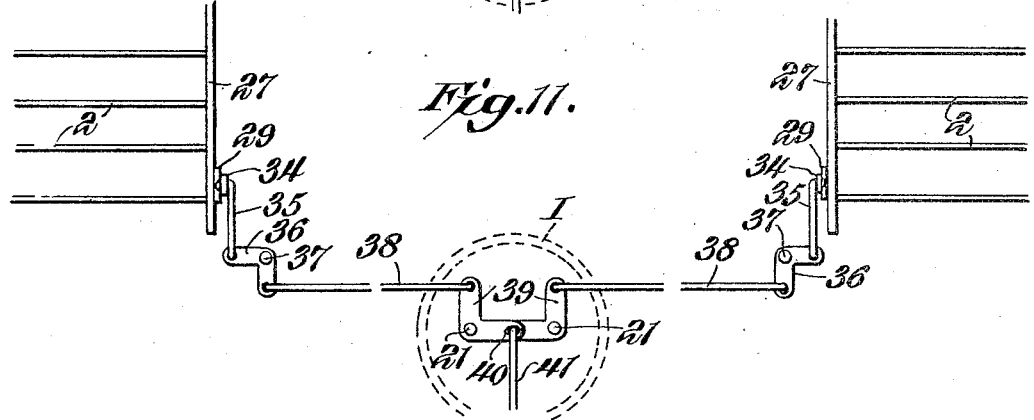
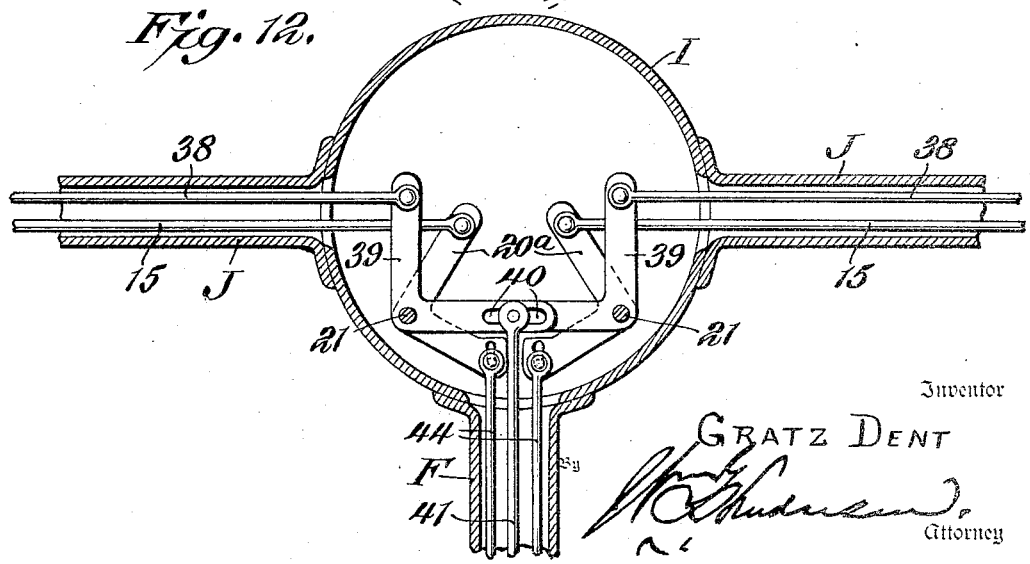
Inventor
GRATZ DENT
Attorney

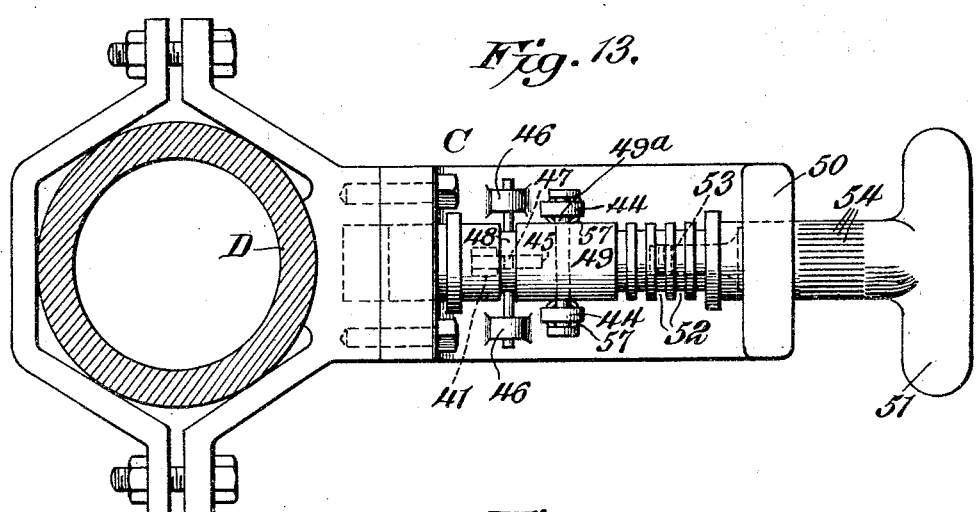
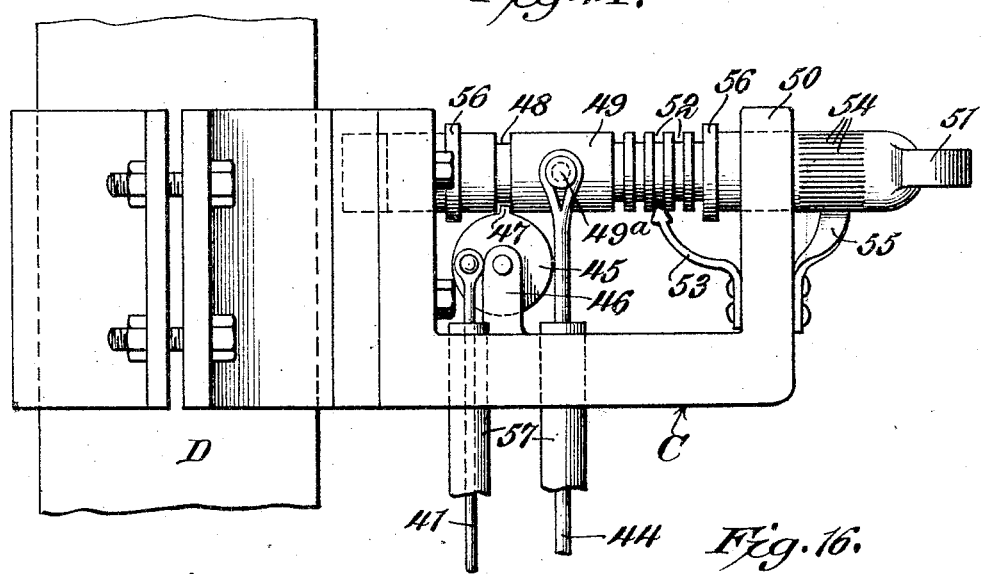
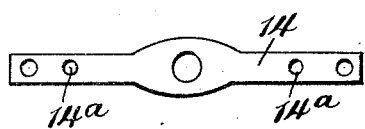
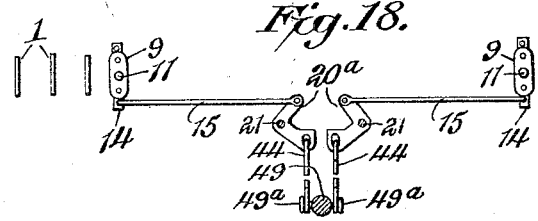

Patented Mar. 8, 1932

1,848,326

UNITED STATES PATENT OFFICE

GRATZ DENT, OF SAVANNAH, GEORGIA

VEHICLE HEADLIGHT

Application filed September 27, 1928. Serial No. 308,623.

This invention relates to headlights, especially to headlights for automobiles, and has for its primary object the provision of means which may be readily installed in various types of headlights already upon the market, whereby the beams of light projected therefrom may be easily directed to any desired locality in front of the car, by the driver thereof, to suit his requirements.

Another object is to provide means capable of instant manipulation by the hand of the driver without removing his hands from the steering wheel and without distracting his attention from the roadway, to enable him to throw the beams of light either to the right or the left of the direction of travel or to elevate or lower said beams, or to simultaneously shift the beams in a vertical and lateral direction, so as to illuminate the roadway close to the car, or at a considerable distance therefrom.

A final object is to provide a simple construction capable of being manufactured at a low cost and incorporated in the headlight structure to be entirely concealed from view and to accomplish the above desired results without the use of additional electric lamps, the parts being of such a nature as to embody the maximum strength and durability without the danger of becoming deranged or broken, and completely housed within the lamp in rear of the lens thereof to avoid rust or corrosion and insure continued effectiveness of operation.

A full and complete understanding of the invention may be obtained from a consideration of the following detailed description, taken in connection with the accompanying drawings forming a part of this specification; it being understood that while the drawings show a practical form of the invention, the latter is not to be confined to strict conformity with the showing thereof, but may be changed or modified, so long as such changes or modifications mark no material departure from the salient features of the invention, as sought to be specifically pointed out in the appended claims.

In the drawings, in which similar reference characters designate corresponding parts throughout the several figures:

Figures 1, 2 and 3 are a side view, front end view, and top plan view, respectively, showing the general arrangement of the controlling means for the device and the manner of installing the invention on an automobile;

Figure 4 is an enlarged front view of one of the light-beam controlling devices installed in a headlight, the lens being removed and the casing being in section;

Figure 5 is a central, vertical section through the subject matter of Figure 4;

Figure 6 is a view similar to Figure 5, but looking in the opposite direction;

Figure 7 is a horizontal section through the device;

Figures 8, 9, and 10 are diagrammatic views illustrating the action of the means for simultaneously controlling the lateral movements of the light beams projected from each of the headlights;

Figure 11 is a similar view of the means for controlling the up and down movements of the light beams;

Figure 12 is a horizontal sectional view showing a slightly modified means whereby the beams from one headlight may be adjusted in a lateral direction, independently of the other headlight;

Figure 13 is a top plan view of hand-controlled means adapted to be secured to the steering post of the automobile, for independently manipulating the lateral beam-controlling means, the same being adapted for use in connection with the arrangement shown in Figure 12;

Figure 14 is a side elevation of the subject matter of Figure 13;

Figures 15, 16, and 17 are detail views of parts of the device;

Figure 18 is a detail view, similar to Figs. 8, 9 and 10, showing controlling means for independently shifting the right or the left hand headlight;

Figure 19 is a fragmentary view, similar to Fig. 13, and showing hand-controlled means for shifting the parts as shown in Figs. 8, 9, and 10.

More or less difficulty has been encountered in the use of headlights of the so-called "dirigible" type where the entire headlight structure is caused to turn bodily about a vertical axis by external means which are liable to derangement by reason of their exposed position and which fail to project the light in the desired direction, depending, as they do, upon the radius of the turn being made by the automobile when rounding a curve or corner.

To overcome these disadvantages, the present invention has been designed whereby separate means, entirely housed within the headlight casing, are employed for deflecting a series of vertically-disposed shutters to shift the light to the right or the left and a similar series of horizontally disposed shutters may be independently deflected to shift the light upwardly or downwardly, or simultaneously with the movements of the vertical shutters, the said means being housed with economy of space and not interfering, in any way, with the full illumination by the headlights.

To this end the invention comprises the said vertical and horizontal shutters located within the casing A of the headlight at each side of the automobile B and in advance thereof, in the usual manner. The shutters are adapted to be actuated, as aforesaid, by means indicated generally at C and secured to the steering post D close to the steering wheel E and within easy reach of the operator, suitable connections in the form of push and pull wires being made between the shutters in the headlights and the said operating means, said wires being preferably housed in a flexible, tubular casing F to protect the same and to permit the wires to pass through adjacent to the motor and other parts beneath the hood G without interference and thence through or under the radiator H to a casing I, in advance of the radiator proper and to one side thereof. From this casing other actuating wires or rods pass in a transverse direction, preferably through rigid tubular conduits J to the headlights A at either side for connection with the shutters to manipulate the same.

In each headlight casing A there is provided a series of spaced, vertically-disposed shutters 1 covering an area substantially equal to the area of reflected light from the lamps. These shutters are preferably formed of thin, stiff, sheet metal strips and they are located immediately in rear of the lens of the headlight, while a similar series of spaced, horizontally disposed shutters 2 covering an equal area, are disposed in rear of the vertical shutters and in advance of the lights and reflectors, the two series of shutters being housed within the space at the front of the headlights provided by the usual annular enlargement found at the front of headlights.

The vertical shutters 1 are each mounted for rotation in an upper cross bar 3 terminally secured in a horizontal position at the top of said space while in the lower portion of said space there is provided a pair of spaced, transversely disposed brackets 4 and 5 which are suitably secured to the casing A which serve to support means for rotating the shutters in a manner to be described. The upper ends of the shutters 1 are each provided with a central, longitudinally disposed trunnion 6 which is mounted to rotate in an opening formed in the cross bar 3, while at their lower ends, the shutters are provided with spaced trunnions 7, preferably in alinement with their longitudinal edges, each corresponding trunnion of the shutters being adapted to be mounted in spaced openings formed in actuating rods 8, arranged in spaced relation at the lower portion of the casing and transversely of the headlight.

The rods 8 are supported, adjacent to their ends, upon swinging plates 9 and are pivotally connected to the ends thereof, at 10, so that when said plates are caused to be rotated about a central pivot 11, it will be seen that the rods 8 are caused to be advanced longitudinally in opposite directions and the vertical shutters 1 will be correspondingly rotated in one direction or the other about their central trunnions 6 at their upper ends, with the result that the light beams will be deflected to one side or the other as desired.

The swinging plates 9 are supported from brackets 4 and 5 by means of blocks 12 having reduced end portions (Fig. 16) and upon which the plates swing or rotate, the lower reduced portions of the blocks passing through the brackets 4, 5 respectively, and havings nuts 13 screwed on to such ends to secure the blocks to the brackets, as shown in Figure 4 of the drawing.

The supporting block 12 located at the inner sides of each headlight and adjacent to the conduits J, are somewhat shorter than the other block for the reception of a rocker arm 14 mounted to rotate on said block and rivetted or otherwise secured through apertures 14a (see Figure 15) to the swinging plate 9 to actuate the latter and consequently cause the entire series of vertical shutters to be simultaneously and uniformly deflected for shifting the light beams to the right or the left.

The rocker arm 14 is longer than the plate 9 and extends beyond the ends of the same for the reception, at one end, of the terminal connection of a pull and push rod or wire 15 which passes out of the casing A, through the front conduit J and to the aforesaid casing I for actuation by means to be described. The same end of the rocker arm is engaged by a rod or wire 16 having connection with a retractible spring 17 secured at its lower end to the foot of the bracket 4, and serving to return the shutters to a normal position in parallelism to each other and to the longitudinal axis of the headlight, so as to offer the minimum amount of interference to the light beams when directed to the front. The foregoing applies to the two wire system control as illustrated in Figs. 8 to 11 of the drawings.

Located within the casing I there is a pair of oppositely disposed bell-crank levers 20, fulcrumed, as at 21, at their angles and having opposed arms pivotally connected to the wires or rods 15 extending through the conduits J while the other arms of the bellcranks are slotted, as at 22, for connection to the terminal of a wire or rod 23 which extends through the casing F and is connected to the manual operating means (shown in Fig. 14) mounted on the steering post of the automobile, so that it will be seen that any movement of the latter will result in a simultaneous and corresponding movement of the two series of vertical shutters in the headlights A.

The horizontal shutters 2 are formed similarly to the vertical shutters having central, longitudinal trunnions 24 which are mounted in suitable apertures in a vertically disposed supporting bar 25 located at the side of the casing A opposite to the conduit J and rigidly secured at its terminals to said casing. The other ends of the shutters 2 are provided with spaced trunnions 26 seated in spaced apertures of vertically disposed actuating rods 27 which are pivotally connected, as at 28, to the ends of swinging plates 29 centrally pivoted on blocks 30 which are held by nuts 31 to an upper bracket 32 and a lower bracket 33 respectively, the latter being located just above the inlet of the conduit J. The lower swinging plate 29 coacts with a rocker arm 34 having projecting ends to one of which there is connected a pull rod 35 passing downwardly and connected to one arm of a bellcrank lever 36 fulcrumed at its angle on a pin 37 in a position to have the free end of its other depending arm connected to a push or pull rod or wire 38 extending through the conduit J in addition to the aforesaid wire or rod 15.

The other ends of the wires or rods 38, where extending into the casing I are connected to the opposed arms of bell-cranks 39 which may be mounted at their angles upon the same pivotal pins 21 as are the aforesaid cranks 20. The other arms of the cranks 39 are slotted as at 40 (see Figs. 11 and 12) and are adapted to be actuated by a connection 41 extending through the tubular casing F to the operating means C.

The form of the invention as hereinbefore described may be said to constitute a "two-wire system" of controlling the shutters to deflect the beams to the right or the left or to raise or lower the same, since there are only two wires (23 and 41) passing rearwardly to the actuating means, and in this system it will be noted that the lateral movements of the beams projected from the two headlights are necessarily the same, that is, each headlight will throw its beams to the right or the left simultaneously with the other headlight and to the same degree, dependent upon the direction of movement of the slats or shutters.

It is desirable, however, at times, to be able to change the direction of the light projected by only one headlight leaving the light of the other headlight directly ahead or in some other relation and to accomplish this a slightly different arrangement is necessary of the parts located in the casing I. In this arrangement, which may be called a "three-wire system", it will be seen by reference to Figure 12, the wires 38 are connected to bellcranks 39 and actuated by a single pull or push wire or rod 41 in the same manner as hereinbefore described, but the wires or rods 15 are connected to two separate and distinct bell-cranks 20a mounted at their angles on the pivots 21 and adapted to be separately and independently actuated by two separate wires or rods 44 which extend, together with the connection 41 through the tubular, flexible casing F to the manually operated means about to be described.

In the three wire control system a stop 18 in the form of an adjustable screw mounted in an arm 19 secured to the bracket 5 is provided to check the return movement of the vertically disposed shutters under the pull of the spring 17 by contact therewith of one end of the swinging or rocking plates 9. In this same three wire control system the rocker arm 34 of the horizontally disposed shutters is adapted to be returned to normal position with the horizontal shutters 2 in exact parallel relation to the longitudinal axis of the head-light, by means of a rod or wire connection 42 attached to a spring 43 which maintains the end of the rocker arm in engagement with a stop 34a, as in the case of the vertical series of shutters 1.

The manually operated means C comprises a suitable metallic bracket clamped in any desired manner to the steering post D and constructed to support the various parts as follows. The single connection 41 which actuates the horizontal shutters 2 emerges from the tubular casing F which latter may be connected to the bracket C in any desired manner (not shown). The wire 41 is terminally connected to a wrist pin of a revolving dial 45 mounted in suitable spaced bearings 46 upstanding from an extension of the bracket C. The dial has a radial finger or extension 47 which is engaged in an annular channel 48 of a double-acting bolt or plunger 49 having its inner end mounted for sliding and revolving movement in the bracket while the outer end is similarly mounted in an upstanding arm 50 of said bracket. The other wires or rods 44 emerging from the casing F pass through the base of the bracket, as does the connection 41, and are formed into loops at their terminals for connection with diametrically opposite pins 49a projecting from the plunger 49, so that when the latter is rotated, by means of a handle 51, one of the wires 44 will, in the case of the two-wire system, be pulled while the other will be pushed in an obvious manner. The bell-cranks 20a are slotted (as shown in Figs. 12 and 18) where the wires 44 are connected, so that the vertical shutters 1 of one the headlight may be moved independently of the others. As shown in Fig. 19, only one connection 23 is used in place of the two members 44, when the parts are shifted as shown in Figs. 8, 9, and 10. Longitudinal movement of the plunger will rock the dial in the desired direction to either pull or push the connection 41. The plunger may be held to prevent accidental longitudinal movement by means of a series of annular grooves 52 formed in the plunger and into which the free end of a spring dog 53 is adapted to engage while the coaction of a series of longitudinal grooves 54 with a similar spring dog 55 will prevent accidental rotary movement of the plunger. Annular flanges 56 serve to confine the longitudinal movement of the plunger and the wires 41 and 44 are preferably surrounded by tubes 57 where passing through the base of the bracket.

From the foregoing, it will be seen that simple and effective means have been provided for controlling the beams of light from the headlights of automobiles or the like and that the operator may easily direct the lights to extend a considerable distance in advance of the automobile, and simultaneously therewith, at points upon the roadway adjacent to the car to the right or the left, or that only one light may be deflected to either side as described. It will be further seen that the device is of simple construction not easily deranged or broken, the manipulation thereof being readily accomplished without removing both hands from the wheel or diverting the attention of the driver from the road while changing his lights, the entire apparatus being contained wholly within the rim of the headlight and may be applied in position without interfering with any of the operative parts of the car and without adding anything unsightly thereto. The connections between the rims of the headlights and the ends of the conduit J may be effected by means of suitable union fittings (see Figs. 2 and 3) in order to permit of ready detachment for the usual rotary movement of the rims, when removing the latter to gain access to the interior of the headlights.

The front rim of the headlights which secures the transparent front plate or glass in place may be attached by either screw threads or by a slot and pin attaching means of well-known construction, and not illustrated because not claimed herein.

The stop 18 for limiting the recoiling force of spring 17, and also the stop 34a for limiting the recoiling force of spring 43, while desirable under some constructions, yet may be omitted without affecting other features of the invention.

Having fully described my invention, and set forth its merits, what I claim is:—

1. In a headlight; a frame mounted within the casing of the headlight; a series of vertically disposed, parallel shutters each having at one end a central trunnion mounted in the frame to permit the shutters to rotate and having spaced trunnions at their other ends; parallel, horizontal bars having bearings engaging the spaced trunnions and mounted to move longitudinally in the frame; means for simultaneously moving the bars in opposite directions to rotate the shutters; a series of horizontally disposed, parallel shutters each having at one end a central trunnion mounted in the frame adjacent to the vertical shutters to permit the shutters to rotate and having spaced trunnions at their other ends; parallel vertical bars having bearings engaging the spaced trunnions and mounted to move longitudinally in the frame; and means for simultaneously moving the last-named bars in opposite longitudinal directions to rotate the shutters.

2. In head-lights; a frame mounted within the casing of the headlight; a series of vertically disposed, parallel shutters each having at one end a central trunnion mounted in the frame to permit the shutters to rotate and having spaced trunnions at their other ends; parallel, horizontal bars having bearings engaging the spaced trunnions and mounted to move longitudinally in the frame; means for simultaneously moving the bars in opposite directions to rotate the shutters; a series of horizontally disposed, parallel shutters each having at one end a central trunnion mounted in the frame adjacent to the vertical shutters to permit the shutters to rotate and having spaced trunnions at their other ends; parallel vertical bars having bearings engaging the spaced trunnions and mounted to move longitudinally in the frame; and coiled springs connected to the vertical and to the horizontal pairs of parallel bars to automatically return the two series of shutters to normal positions when the actuation means is released.

In testimony whereof I affix my signature.

GRATZ DENT.